United States Patent [19]

Jennings

[11] Patent Number: 4,668,657

[45] Date of Patent: May 26, 1987

[54] IRON CATALYST AND METHOD OF PRODUCING IT

[75] Inventor: James R. Jennings, Yarm, England

[73] Assignee: Imperial Chemical Industries PLC, London, England

[21] Appl. No.: 758,413

[22] Filed: Jul. 24, 1985

[30] Foreign Application Priority Data

Aug. 3, 1984 [GB] United Kingdom ............... 8419851
Mar. 25, 1985 [GB] United Kingdom ............... 8507691

[51] Int. Cl.$^4$ .................. B01J 21/04; B01J 23/74; B01J 23/78
[52] U.S. Cl. .................. 502/328; 502/330; 502/336; 423/362
[58] Field of Search .............. 502/328, 330, 336; 423/362, 363

[56] References Cited

U.S. PATENT DOCUMENTS 4,298,588  11/1981  Pinto ...................... 423/362 X

FOREIGN PATENT DOCUMENTS 598632  3/1978  U.S.S.R. ...................... 502/330

OTHER PUBLICATIONS

Rubinshtein et al., "Extensive Study of the Iron Catalysts of Ammonia Synthesis", Kinetika i Kataliz, 1965, 6(2), pp. 285-293.

Primary Examiner—W. J. Shine
Attorney, Agent, or Firm—Cushman, Darby & Cushman

[57] ABSTRACT

An iron oxide containing precursor to a catalyst, for e.g. ammonia synthesis having a surface area above 10 $m^2.g^{-1}$ also containing alumina and cobalt oxide. The latter serves to increase the catalytic activity and/or reduce the rate of decline of catalytic activity. For use as an ammonia synthesis catalyst precursor, an alkali metal, e.g. potassium, is preferably incorporated into the composition to promote catalytic activity. The composition may be made by precipitation followed by calcination.

12 Claims, No Drawings

IRON CATALYST AND METHOD OF PRODUCING IT

This invention relates to catalysts and in particular to an oxidic precursor of an iron catalyst and a method for producing it.

Iron catalysts used for example in ammonia synthesis or nitrile hydrogenation are commonly made by steps including melting iron oxide possibly containing small quantities of other oxides, solidifying the melt and crushing the solid to the required particle size. It has been proposed, for example by Akimov et al. (Kinetika i Kataliz, 1965, 6(2), 285-293, published in translation by Consultants Bureau, New York, USA), to make an ammonia synthesis catalyst by co-precipitation of ferric hydroxide and aluminium hydroxide. With precursors made by that route, the precipitate is then calcined to convert the hydroxides to oxides and is then pelleted.

Providing the calcination temperature is not excessive, for example the calcination temperature should desirably not exceed 600° C., precipitated oxidic precursor compositions are characterised by a much higher surface area (BET method using nitrogen) than precursors prepared by the fusion route: while the latter generally have a BET surface area below 1 $m^2.g^{-1}$, precipitated oxides precursors generally have a BET surface area of at least 10 $m^2.g^{-1}$.

Upon reduction of the precursor to convert the iron oxide to active metal catalyst, such precursors having a high BET surface area give rise to catalysts in which the active metal surface area (as measured by nitrous oxide decomposition) is significantly higher than in catalysts prepared by the fusion route.

Despite their lower density compared to fused catalysts, precursors made by precipitation can give rise to catalysts having a greater activity per unit catalyst bed volume than catalysts made by the fusion route.

The alumina serves to act as a stabiliser to reduce sintering of the active metal on reduction and/or during use: Such sintering reduces the effective surface area of the active metal. Even so there is generally a marked decline in catalytic activity with time.

We have now devised catalysts which have a particularly high activity: in some cases the decline in activity is less pronounced. In the present invention, some of the iron is replaced by cobalt.

Accordingly the present invention provides an oxidic catalyst precursor composition having a BET surface area of at least 10 $m^2.g^{-1}$ and containing oxides of iron, aluminium and cobalt, the proportion of said oxides being such that, after ignition at 600° C., the ignited composition contains at least 70, particularly at least 75% by weight iron oxide (expressed as $Fe_2O_3$), at least 0.5% by weight of alumina (expressed as $Al_2O_3$), and from 0.5 to 20, particularly 0.5 to 15% by weight of cobalt oxide, (expressed as CoO).

In order to promote catalytic activity for ammonia synthesis, it is usual to incorporate into the precursor a compound of an alkali metal having an atomic number greater than, or equal to, 19.

While ammonia synthesis catalysts containing only a small amount of alkali metal, whether or not they contain cobalt, may show a less pronounced catalytic activity decline—and in some cases show an increase in activity with time, the level of activity of such catalysts is often inadequate. Addition of greater amounts of alkali metal to promote adequate activity generally results in a significant decline in activity with time, unless the composition also contains cobalt.

The replacement of some of the alumina with an alkaline earth, e.g. magnesia, however enables active catalysts to be made with a low alkali metal content.

In the precursors of the invention, after ignition the iron oxide content is preferably in the range 80 to 96% by weight.

The alumina content (after ignition) is preferably in the range 1-10, particularly 2-8%, by weight. The cobalt oxide content (after ignition) is preferably in the range 0.6 to 10% by weight. Relatively small amounts of cobalt oxide, eg up to about 5% generally have the effect of reducing the rate of decline of catalytic activity. Higher amounts may not reduce the rate of activity decline but generally give particularly active catalysts.

Where an alkaline earth is also present, the alkaline earth metal may be magnesium, calcium, strontium, or barium, but is preferably magnesium or calcium. The amount of alkaline earth employed depends on the amount of alumina present: thus the amount of alkaline earth is preferably sufficient that the ratio of alkaline earth metal X atoms to aluminium atoms is at least 0.5 and is preferably 1 to 5. The use of too much alkaline earth is undesirable because of difficulties in obtaining a uniform dispersion thereof in the composition. Also the use of too much alkaline earth naturally reduces the proportion of iron in the composition and so reduces the amount of active metal per unit catalyst volume. For this reason it is preferred that the combined weights of alumina and alkaline earth (expressed respectively as $Al_2O_3$ and XO where X is the alkaline earth metal) (after ignition) amount to less than 20% by weight of the composition.

For nitrile hydrogenation catalysts no alkali metal compound need by employed, but as mentioned above, for ammonia synthesis catalysts an alkali metal of atomic number equal to or greater than 19 is generally required. The amount of alkali metal, which may be potassium, rubidium, or cesium, to be employed depends on the amount, if any, of "free", alkaline earth (as opposed to alkaline earth in the form of an alkaline earth aluminate) in the composition. If a "free" alkaline earth is present it is preferred that the amount of alkali metal present is such that the ratio of alkali metal atoms to aluminium atoms is below 0.3, particularly between 0.05 and 0.25. The presence of sodium in the composition is generally undesirable: the amount of sodium, expressed as $Na_2O$, is preferably less than 0.1%, particularly less than 0.05%, by weight of the composition (after ignition) and is ignored when computing the alkali metal:aluminium atomic ratio. Where there is no "free" alkaline earth present, the alkali metal:aluminium atomic ratio is generally above 0.15, particularly in the range 0.2 to 0.5, but may be somewhat higher for compositions of a high alumina content.

The precursors of the invention may be made by calcining an intimate mixture of iron, cobalt, aluminium, and, if used, alkaline earth metal, compounds such as hydroxides and/or carbonate and/or basic salts decomposable to oxides by calcination. If an alkali metal is required, the latter can be added before or after calcination.

It is preferred that the intimate mixture is made by co-precipitation, by mixing slurries of the precipitates, or by precipitating iron into a slurry of the alumina or hydrated alumina. The cobalt may be co-precipitated with the iron or mixed with the alumina or hydrated alumina prior to precipitation of the iron. Where an alkaline earth is employed this may be co-precipitated with the alumina.

The iron is preferably precipitated as a hydrated ferric oxide. The precipitation conditions are preferably such as to produce the hydrated oxide in gel form, especially if hydrated alumina is co-precipitated with the iron oxide, since then the alumina can also be in gel form and crystallographic incompatibility can be avoided. Alternatively the hydrated oxide is in the lepidocrocite (gamma FeOOH) form, in which event the alumina can be in the isomorphous böhmite ("gamma AlOOH" or "alpha alumina monohydrate") form. If desired, the crystal shape of the lepidocrocite can be deliberately controlled, for example in acicular shape, possibly using a shape-stabilising additive. Another possibility is to produce hydrated ferric oxide in the goethite (alpha FeOOH form) and to co-precipitate hydrated alumina in the diaspore ("beta alumina monohydrate") form as a minor component of mixed crystals.

The precipitation, or precipitations, is preferably effected at a pH of above 6.5 and at a temperature of 15° to 65° C. In a particularly preferred mode of operation the precipitation of at least the iron is effected by continuously feeding the aqueous iron solution and the precipitant to a junction from which the resultant precipitate is continuously removed.

Because of the undesirability of sodium in precursors intended for use as ammonia synthesis catalysts and the relatively high cost of other alkali metals, the precipitation is desirably conducted using ammonia as the precipitant. This is satisfactory where only relatively small amounts of cobalt are required in the composition. However, undue wastage of cobalt is liable to occur where higher proportions of cobalt are required as a result of the formation of cobaltammines. Therefore where relatively high proportions, eg above 3%, of cobalt oxide in the precursor (after ignition), the precipitation should be effected with an alkali metal hydroxide or carbonate. Surprisingly even when using a sodium compound as the precipitant, precursors that give a particularly high catalytic activity can be obtained.

The precipitate should then be washed, particularly where one or more of the reactants contained sodium, to remove soluble components. Normally the precipitate is then dried and calcined, typically at a temperature in the range 200°-500° C.: The requisite amount, if any, of alkali metal can be incorporated by impregnating the precipitate before or after calcination with a suitable solution, e.g. potassium carbonate.

The resulting composition may then be pelleted or roll compacted: a fabrication aid such as graphite may be incorporated.

In preferred pelletised catalyst precursors, the iron oxide has an O:Fe atomic ratio in the range 1.2 to 1.4. Such precursors may be made by precipitation from a solution containing ferric and ferrous iron in a proportion corresponding to the desired O/Fe atomic ratio, then calcining that composition in a neutral or oxidatively balanced atmosphere to give the oxide. For this precipitation a dissolved reducing agent is desirable and the atmosphere in contact with the solutions should be neutral or balanced.

Alternatively, and preferably, the iron is precipitated in the ferric state and is then subjected to a controlled mild de-oxidation, e.g. by contacting with a reducing agent of controlled strength, for example a gaseous mixture of reducing and mildly oxidising compounds or heating it in an atmosphere of low enough oxygen content, for example in vacuo. If desired it can be done in the slurry phase by means of a gaseous or dissolving reducing agent.

In a preferred mode of operation, the calcined intimate mixture, optionally after incorporation of the alkali metal compound, is subjected to the de-oxidation by passage of a suitable gas stream thereover: the composition is preferably pelleted or compacted after such a de-oxidation step: however it may be desirable to pelletise or compact the composition prior to de-oxidation to enable the composition to be more readily handled before and during the de-oxidation step. In that case it is preferred that the composition is re-pelleted or compacted after the de-oxidation.

The use of a composition in which the iron oxide has an O:Fe atomic ratio in the range of 1.2-1.4, i.e. an oxidation state corresponding approximately to that of magnetite, to make the catalyst precursor pellets or compacts has the advantage that the density of the pellets or compacts is increased compared to pellets or compacts made from a composition wherein the iron oxide is in the oxidation state corresponding to maematite. This enables a catalyst bed to have a greater iron content per unit bed volume to be achieved.

The step of de-oxidation to iron oxide in the specified O/Fe atomic ratio range is carried out preferably by means of a mixture comprising 10-90, especially 20-80, volume percent of oxidant gas, the balance being reductant gas, in addition to any non-reactant gases. Conveniently the oxidant gas is steam and the reductant gas is hydrogen. Steam is especially desirable when dehydration of hydrated iron oxide to an unwanted ferric oxide phase is to be avoided. Steam+hydrogen is preferred if the starting oxide contains compounds of sulphur or chlorine. Other mixtures include carbon monoxide+carbon dioxide and also chemically reactive mixtures such as carbon monoxide+steam, methanol+steam and carbon dioxide+hydrogen, which require precautions to cope with exotherms or endotherms. Other organic compounds, possibly mixed with hydrogen and/or steam, can be used.

Using such a gas mixture the temperature of de-oxidation is typically in the range 250°-500° C. Higher temperatures within this range are desirable if the starting iron oxide is converted only slowly to the magnetite structure.

If de-oxidation in an atmosphere of low oxygen content is used, for example in vacuo or in a current of nitrogen or noble gas is used, the temperature is typically in the range 200°-300° C.

If the oxide having the desired O/Fe ratio is made by dehydration of a hydrated oxide already in that oxidation step, it may be subjected to a steam+hydrogen mixture to remove any compounds of sulphur or chlorine introduced during its preparation.

Reduction of the precursor to active catalyst is conveniently effected by hydrogen at a temperature in the range 300°-500° C. If the catalyst is to be used for ammonia synthesis, the reducing gas used is usually ammonia synthesis gas and is passed over the precursor in the reactor in which synthesis is to take place. Precautions are taken to avoid back-diffusion of water vapour into contact with iron formed by the reduction and to prevent over-heating once ammonia synthesis has begun. Alternatively the precursor can be reduced by nitrogen-free hydrogen. In either event the gas pressure is suitably in the range 1-300, for example 20-120 bar abs. In an alternative procedure the precursor is reduced outside the synthesis reactor and passivated by cool dilute oxygen to give "pre-reduced" catalyst, which thereafter is charged to the synthesis reactor and therein fully reduced.

If the catalyst is to be used for nitrile hydrogenation, the precursor is usually reduced with hydrogen, preferably containing a few percent of ammonia.

The resulting catalyst has an iron surface area significantly greater than that of a fused catalyst.

The invention provides a process of ammonia synthesis over the catalyst and in these preferred conditions:

| Temperature °C. | 300–500, especially 35–430. |
| Pressure, bar abs | 20–250, especially 40–120. |
| Gas mixture | $H_2/N_2$ up to 3.1, especially 2.5 to 3.0 or 3.0 or (as in our USP 4383982) 1.5 to 2.3. |

The invention provides also a process of hydrogenating adiponitrile to hexamethylene diamine over the catalyst and in these preferred conditions:

| Temperature °C. | 80–200 |
| Pressure bar abs | 200–400 |
| State of matter | preferably supercritical |
| Gas mixture | hydrogen + 2–10 parts by weight of ammonia per part of adiponitrile. |

EXAMPLE 1

An oxidic mixture was prepared by precipitation by adding an aqueous ammonia solution at 20° C. to an aqueous solution containing 0.66M ferric nitrate, 0.037M cobalt nitrate, and 0.031M aluminium nitrate in the requisite proportions to give a slurry of pH 11.

The precipitate was collected on a filter, washed until nitrate free, and dried at 120° C. The precipitate was calcined for 6 hours, ground, wetted with potassium carbonate solution to give the requisite potassium content (samples 1A–1C) and then dried.

The product was then pelleted, using about 1% by weight of graphite as a pelleting aid, to form cylinders 8.8 mm diameter and 10 mm long. The above procedure was repeated, varying the proportions of cobalt nitrate and aluminium nitrate, to give a range of precursor compositions all of which had a BET surface area well above 10 $m^2.g^{-1}$.

The samples were then tested by the following procedure.

Samples of the pellets were crushed to the sieve range 0.6 to 1.0 mm and charged each to a laboratory reactor having a catalyst bed 3.2 mm in diameter and 32 mm long. Each charge was activated by reduction in a 3:1 hydrogen:nitrogen mixture at 50 bar abs. pressure, raising the temperature to 475° C. over 12 h and holding that temperature for 3 h. Then each charge was operated in ammonia synthesis at that pressure of 450° C. and at a space velocity of 40000 $cm^3$ of gas per g of catalyst per hour. From percentage conversions measured at this and other space velocities the "initial" rate constant, per unit catalyst precursor weight, is calculated.

To assess the rate of decline of activity an accelerated aging procedure is then adopted by increasing the temperature to 550° C. and maintaining that temperature for 6 hours. The temperature is then reduced to 450° C. and the conversion at various flow rates measured. The "final" rate constant, per unit catalyst precursor weight, is then calculated.

In the following table of results the initial and final relative activities are the ratio of the initial and final rate constants, respectively, to the initial rate constant of a standard fused catalyst.

| Sample | Calcination Temperature (°C.) | Composition (wt %)* | | | | Relative Iron Surface area+ | Relative activity | | F/I |
| --- | --- | --- | --- | --- | --- | --- | --- | --- | --- |
| | | $Fe_2O_3$ | CoO | $Al_2O_3$ | $K_2O$ | | Initial (I) | Final (F) | |
| 1A | 250 | 94.9 | 0.7 | 2.9 | 0.8 | 2.1 | 1.88 | 1.88 | 1.00 |
| 1B | 400 | 95.1 | 0.7 | 2.9 | 0.6 | 1.5 | 1.88 | 1.77 | 0.94 |
| 1C | 400 | 94.5 | 0.7 | 2.9 | 1.2 | 1.7 | 2.11 | 1.97 | 0.93 |
| 1D | 250 | 94.1 | 1.2 | 2.8 | 0.6 | — | 1.70 | 1.56 | 0.92 |
| 1E | 250 | 93.9 | 1.2 | 2.8 | 0.7 | 2.1 | 2.02 | 2.02 | 1.00 |
| 1F | 400 | 94.1 | 1.2 | 2.8 | 0.5 | 1.5 | 1.74 | 1.63 | 0.94 |
| 1G | 400 | 94.4 | 1.2 | 2.8 | 0.7 | 2.1 | 1.79 | 1.79 | 1.00 |
| 1H | 400 | 93.6 | 2.3 | 3.0 | 0.9 | — | 1.95 | 1.90 | 0.97 |
| 1I | 400 | 96.9 | 0 | 2.5 | 0.6 | — | 2.11 | 1.88 | 0.89 |

*Composition after ignition at 600° C.
+ In reduced catalyst, relative to that of the standard fused catalyst.

Sample 1G had a pellet density of 2.1 $g.cm^{-3}$. To show the effect of de-oxidation, another sample of pellets 1G was charged to a laboratory test reactor normally used for the carbon monoxide/steam shift reaction and de-oxidised in the following conditions:

| Pressure | 1 bar abs. |
| Temperature | 300° C. |
| Gas mixture % v/v | |
| $H_2$ | 40 |
| CO | 5 |
| $CO_2$ | 5 |
| steam | 50 |

The balance of oxidising gates ($H_2O$, $CO_2$) and reducing gases is such that the starting ferric oxide $Fe_2O_3$ is de-oxidised to $Fe_3O_4$ but no further. The reactor was cooled in a current of nitrogen, then discharged. The product was now stable to air provided it was kept cool. It was ground to a fine powder, mixed with 1.0% w/w of graphite and compressed into cylinders as before. Using the same applied pressure in the pelleting machine the pellet density was 3.0 g $cm^{-3}$. When tested for activity as above, the initial relative activity was 1.79 and the final relative activity was 1.69, so that the F/I ratio was 0.94. The iron surface area was about 1.7 times that of the standard fused catalyst. In a further experiment, a sample of the ground, calcined, precipitate from which sample 1G was prepared was pelleted, de-oxidised, ground, and repelleted as above to give pellets of density 2.9 cm$^3$.g$^{-1}$. In this case the impregnation with potassium carbonate was effected on the ground, de-oxidised, material prior to re-pelleting. When tested for activity as above, the initial relative activity was 1.74 and the final relative activity was 1.69, so that the F/I ratio was 0.97. The iron surface area was about 1.5 times that of the standard fused catalyst.

EXAMPLE 2

The precipitation procedure of Example 1 was repeated but using solutions having a greater cobalt nitrate content and using sodium carbonate as the precipitant instead of ammonia. Comparative precipitates were also made wherein the cobalt nitrate was omitted but sodium carbonate used for precipitation. The resultant precipitates were washed, dried, calcined, wetted with potassium carbonate, dried and pelleted as in Example 1. All the precursors had a BET surface area well above 10 m$^2$.g$^{-1}$. The precursors were tested as in Example 1 giving the results shown in the following table.

| Sample+ | Composition* (by weight) | | | | Relative Activity | |
|---|---|---|---|---|---|---|
| | CoO (%) | Al$_2$O$_3$ (%) | K$_2$O (%) | Na$_2$O (ppm) | Initial | Final |
| 2.1 | 9.5 | 2.5 | 0.5 | ~1000 | 2.1 | 1.7 |
| 2.2 | 9.4 | 2.6 | 0.7 | 1100 | 2.6 | 2.1 |
| 2.3 | 9.5 | 2.5 | 0.9 | ~1000 | 2.7 | 2.3 |
| 2.4 | 9.5 | 2.4 | 1.0 | ~1000 | 2.7 | 2.1 |
| 2.5 | 9.5 | 2.5 | 1.4 | ~1000 | 2.4 | 2.1 |
| 2.6 | 9.0 | 2.6 | 0.6 | 55 | 2.2 | 1.9 |
| 2.7 | 9.0 | 2.7 | 0.7 | 55 | 2.7 | 2.3 |
| 2.8 | 9.1 | 2.6 | 0.9 | 45 | 2.7 | 2.3 |
| 2.9 | 9.0 | 2.6 | 1.1 | 70 | 2.3 | 2.1 |
| 2.10 | 9.0 | 2.6 | 1.4 | 80 | 2.0 | 1.7 |
| 2.11 | 7.1 | 2.7 | 0.5 | 40 | 2.2 | 1.9 |
| 2.12 | 7.1 | 2.7 | 0.7 | 30 | 2.6 | 2.3 |
| 2.13 | 7.1 | 2.7 | 0.8 | 30 | 2.5 | 2.3 |
| 2.14 | 7.1 | 2.7 | 1.0 | 40 | 2.4 | 2.1 |
| 2.15 | 7.1 | 2.7 | 1.2 | 30 | 2.3 | 2.0 |
| 2.16 | 5.1 | 2.7 | 0.4 | ~200 | 1.7 | 1.6 |
| 2.17 | 5.1 | 2.7 | 0.5 | 180 | 2.1 | 1.7 |
| 2.18 | 5.1 | 2.7 | 0.7 | 160 | 2.3 | 2.0 |
| 2.19 | 5.1 | 2.7 | 0.8 | ~200 | 2.3 | 2.3 |
| 2.20 | 5.1 | 2.7 | 0.9 | 170 | 2.1 | 1.9 |

+calcination temperature 250° C.
*after ignition at 600° C. Balance is Fe$_2$O$_3$.

| Sample+ | Composition* (by weight) | | | | Relative Activity | |
|---|---|---|---|---|---|---|
| | CoO (%) | Al$_2$O$_3$ (%) | K$_2$O (%) | NaO (ppm) | Initial | Final |
| 2.21 | 9.5 | 2.5 | 0.5 | 960 | 2.3 | 1.8 |
| 2.22 | 9.5 | 2.5 | 0.7 | ~1000 | 2.2 | 1.7 |
| 2.23 | 9.5 | 2.5 | 1.0 | ~1000 | 2.7 | 2.3 |
| 2.24 | 9.5 | 2.5 | 1.4 | ~1000 | 2.4 | 2.1 |
| 2.25 | 9.0 | 2.6 | 0.5 | 45 | 2.4 | 2.0 |
| 2.26 | 9.1 | 2.6 | 0.7 | 35 | 2.9 | 2.6 |
| 2.27 | 9.0 | 2.6 | 1.0 | 45 | 2.9 | 2.4 |
| 2.28 | 6.9 | 2.7 | 0.5 | 30 | 2.5 | 2.1 |
| 2.29 | 6.9 | 2.7 | 0.7 | 30 | 2.5 | 2.2 |
| 2.30 | 6.9 | 2.7 | 0.8 | 30 | 2.6 | 2.3 |
| 2.31 | 6.9 | 2.7 | 1.0 | 30 | 2.7 | 2.3 |
| 2.32 | 6.9 | 2.7 | 1.3 | 30 | 2.8 | 2.3 |
| 2.33 | 4.9 | 2.6 | 0.5 | 200 | 2.2 | 1.9 |
| 2.34 | 4.9 | 2.5 | 0.7 | 300 | 2.5 | 2.2 |
| 2.35 | 4.9 | 2.5 | 1.0 | 260 | 2.4 | 2.1 |
| 2.36** | 0 | 3.0 | 0.7 | ~1000 | 1.9 | 1.8 |
| 2.37** | 0 | 3.1 | 1.3 | ~1000 | 2.1 | 1.7 |

+calcined at 400° C.
*after ignition at 600° C. Balance is Fe$_2$O$_3$
**comparative
The variation in the sodium content of the samples 2.1 to 2.37 reflects variations in the thoroughness with which the precipitates were washed.

EXAMPLE 3

22.4 ml of 1M magnesium nitrate solution was added to 44.5 ml of 1M sodium aluminate solution together with sufficient nitric acid to maintain the pH at 7.0±0.5, thereby producing a slurry of "magnesium aluminate". 1800 ml of an aqueous solution of 0.67M ferric nitrate and 0.037M cobalt nitrate was added to 1800 ml of aqueous ammonia (specific gravity 0.88) to produce a slurry of ferric hydroxide containing some cobalt at a pH above 11.

This slurry was added to the "magnesium aluminate" slurry and mixed until homogeneous. The resultant produce was filtered, washed, dried, calcined (at 400° C.), ground wetted with potassium carbonate solution, dried, and pelleted as in Example 1 to give precursors having a BET surface area well above 10 m$^2$.g$^{-1}$.

The precursors were tested as in Example 1 with the following results.

| Sample | Composition* (wt %) | | | | Relative activity | |
|---|---|---|---|---|---|---|
| | CoO | Al$_2$O$_3$ | MgO | K$_2$O | Initial (I) | Final (F) |
| 3A | 0.9 | 1.5 | 0.8 | 0.5 | 2.0 | 2.1 |
| 3B | 0.9 | 1.4 | 0.8 | 0.6 | 2.1 | 2.2 |

*composition after ignition at 600° C. Balance is Fe$_2$O$_3$.

It is seen that not only do the catalysts of the invention have a high ratio of the final to initial activity but also, compared to the standard fused catalyst, they have a high relative activity. This increased activity enables lower ammonia converter temperatures to be employed thus enabling the converter pressure to be reduced, compared to conventional conditions, with consequent savings in compression costs.

I claim:

1. An oxidic catalyst precursor composition having a BET surface area of at least 10 m$^2$.g$^{-1}$ and containing oxides of iron, aluminium, and cobalt, the proportion of said oxides being such that, after ignition at 600° C., the ignited composition contains at least 70% by weight of iron oxide, expressed by Fe$_2$O$_3$, at least 0.5% by weight of alumina, expressed as Al$_2$O$_3$, and from 0.5 to 2.3% by weight of cobalt oxide, expressed as CoO.

2. A composition according to claim 1 also containing a compound of an alkali metal of atomic number equal to, or greater than 19.

3. A composition according to claim 1 wherein the proportion of the oxides is such that, after ignition at 600° C., the ignited composition contains 1 to 10% by weight of alumina, expressed as Al$_2$O$_3$.

4. A process for the production of an oxidic catalyst precursor composition having a BET surface area of at least 10 m$^2$.g$^{-1}$ comprising
   (a) forming a slurry by precipitation of iron, cobalt, and aluminum compounds decomposable to oxides by calcination;
   (b) drying said slurry to form an intimate mixture of said compounds; and
   (c) calcining said intimate mixture at a temperature in the range 200° to 500° C.

5. A process according to claim 4 wherein said iron, cobalt, and aluminum compounds are precipitated in such proportions that, after ignition at 600° C., the ignited composition contains at least 70% by weight of iron oxide, expressed as Fe$_2$O$_3$, at least 0.5% by weight of alumina, expressed as Al$_2$O$_3$, and from 0.5 to 20% by weight of cobalt oxide, expressed as CoO.

6. A process according to claim 4 wherein the iron is precipitated as hydrated ferric oxide.

7. A process according to claim 4 wherein the cobalt compound is co-precipitated with the iron compound.

8. A process according to claim 7 wherein the iron, cobalt, and aluminum compounds are co-precipitated.

9. A process according to claim 4 wherein the catalyst precursor composition also contains an alkaline earth and the aluminum and alkaline earth are co-precipitated.

10. A process according to claim 4 wherein the precipitation is effected at a pH above 6.5.

11. A process according to claims 4 wherein precipitation of at least the iron is effected by continuously feeding an aqueous irons solution and a precipitant to a junction from which the resultant precipitate is continuously removed.

12. A process according to claim 4 wherein the catalyst precursor composition also contains a compound of an alkali metal at atomic number equal to or greater than 19, introduced by impregnating the intimate mixture with a solution of compound of the alkali metal before or after calcination.

* * * * *